United States Patent [19]

Hill

[11] Patent Number: 5,621,473
[45] Date of Patent: Apr. 15, 1997

[54] METHOD AND DEVICE FOR PROVIDING VIDEO INSTANT REPLAY IN A PICTURE-IN-PICTURE

[75] Inventor: Rae L. Hill, Jefferson City, Tenn.

[73] Assignee: Philips Electronics North America Corporation, New York, N.Y.

[21] Appl. No.: 488,543

[22] Filed: Jun. 7, 1995

[51] Int. Cl.⁶ ..................................... H04N 5/45
[52] U.S. Cl. ................ 348/559; 348/565; 348/568; 348/579
[58] Field of Search ........................ 348/559–560, 348/565–568, 579; H04M 5/45, 5/44

[56] References Cited

U.S. PATENT DOCUMENTS

| | | | |
|---|---|---|---|
| 4,665,439 | 5/1987 | Naimpally | 358/183 |
| 4,774,582 | 9/1988 | Hakamada et al. | 348/565 |
| 4,903,127 | 2/1990 | Phillips | 358/148 |
| 4,918,518 | 4/1990 | Phillips | 358/148 |
| 4,970,596 | 11/1990 | Johnson | 358/183 |
| 5,018,014 | 5/1991 | Hashimoto | 348/565 |
| 5,317,399 | 5/1994 | Satake et al. | 348/565 |
| 5,329,320 | 7/1994 | Yifrach | 348/738 |
| 5,371,551 | 12/1994 | Logan et al. | 348/571 |

*Primary Examiner*—Michael Lee
*Attorney, Agent, or Firm*—Laurie E. Gathman

[57] ABSTRACT

Instant replay is provided in the picture-in-picture portion of the television display without requiring compression and decompression techniques. A string of consecutive fields is received and decimated. A plurality of non-consecutive fields is selected and stored in DRAM. Fields are continuously stored until a user selects to view the last stored frames. The last stored frames are then replayed in the PIP portion of the television.

21 Claims, 1 Drawing Sheet

METHOD AND DEVICE FOR PROVIDING VIDEO INSTANT REPLAY IN A PICTURE-IN-PICTURE

BACKGROUND OF THE INVENTION

1. Field of the Invention

The present invention relates in general to television receivers and in particular to a method and apparatus for replaying a previously displayed picture in picture in picture (PIP) form.

2. Description of the Prior Art

Instant replay enables a viewer to rewatch a portion of a television program which the viewer may have missed the first time, or as in the case of sporting events, which the viewer wishes to see again for closer study. U.S. Pat. No. 5,329,320 discloses a television receiver which permits the viewer to play back audio and video information which was previously broadcast. The information is digitized, compressed, and provided to a cyclic storage device for continuously storing the compressed information last output by the compressor over a predetermined time interval. This information is then decompressed at a later time for viewing. The instant replay of U.S. Pat. No. 5,329,320 stores a compressed version of the entire received video and audio which is replayed on the main television display rather than in the PIP display. The type of compression used in U.S. Pat. No. 5,329,320, although not fully disclosed, must maintain substantially all of the detail of the main picture to provide enough resolution for display on the main television display and retain accurate audio information. Such compression and decompression techniques which maintain substantially all of the detail of the received information are expensive processes for providing instant replay.

SUMMARY OF THE INVENTION

Generally speaking, in accordance with the present invention a picture in picture (PIP) instant replay circuit is disclosed which provides video instant replay in the PIP portion of a television screen without the use of compression and decompression techniques.

The PIP instant replay circuit acquires and decimates in time selected non-consecutive fields of video from a received sequence of consecutive video fields. These selected fields are decimated and stored to be replayed at a later time. Decimation reduces the size of the fields so that selected fields can be viewed via the smaller PIP display. In decimation, resolution is sacrificed by eliminating various lines and pixels of each video field. Typical compression techniques do not substantially lower resolution because all of the received information is stored in a compressed form and decompressed for viewing, rather than eliminating pieces of information as in decimation. Because the PIP display is 1/9th the size of the standard display the decrease in resolution as a result of decimation is not such a major impediment to the perceived video and enables easier storage of the video without the need for compression. In addition, most of the already existing PIP decimation circuitry and memory can be used to provide the PIP instant replay.

The selected decimated fields are stored in DRAM and retrieved in sequence to provide instant replay. In a preferred embodiment of the instant invention the rate at which the fields of video are acquired by the PIP instant replay circuit is variable and determines, in part, the perceived continuity of the displayed picture as well as the length of video which can be instantly replayed. If the user selects to display only one out of every four fields received, a greater length of video can be displayed but the viewed picture will appear jumpy and not as smooth and continuous as if every other field is displayed. The user can also select the display rate of the acquired fields. For example, the user can select to display the fields at one-half speed which will display each of the stored fields twice before displaying the next stored field. This display rate operates to provide slow motion for the viewer.

A single step mode is also provided which enables the viewer to step through each stored field at his/her own desired rate.

Accordingly it is an object of the present invention to provide a method and device for instantly replaying a portion of video in the PIP.

Another object of the invention is to provide instant replay without the need for compression and decompression techniques by using the decimation circuitry provided in a PIP circuit.

A further object of the invention is to enable the viewer to select the rate at which fields of video are acquired for instant replay.

Yet another object of the invention is to enable the viewer to select the rate at which the acquired fields are displayed.

Yet a further object of the invention is to enable the viewer to select a single step mode for viewing each acquired field at the viewer's leisure until the viewer desires to see a next field.

Still other objects and advantages of the invention will, in part, be obvious and will, in part, be apparent from the specification.

The invention accordingly comprises several steps and a relation of one or more of such steps with respect to each of the others, and the device embodying features of construction, combination of elements and arrangements of parts which are adapted to effect such steps, all is exemplified in the following detailed disclosure, and the scope of the invention will be indicated in the claims.

BRIEF DESCRIPTION OF THE DRAWINGS

For a fuller understanding of the invention, reference is had to the following description taken in combination with the accompanying drawings in which.

DETAILED DESCRIPTION OF THE PREFERRED EMBODIMENTS

Figure 1:
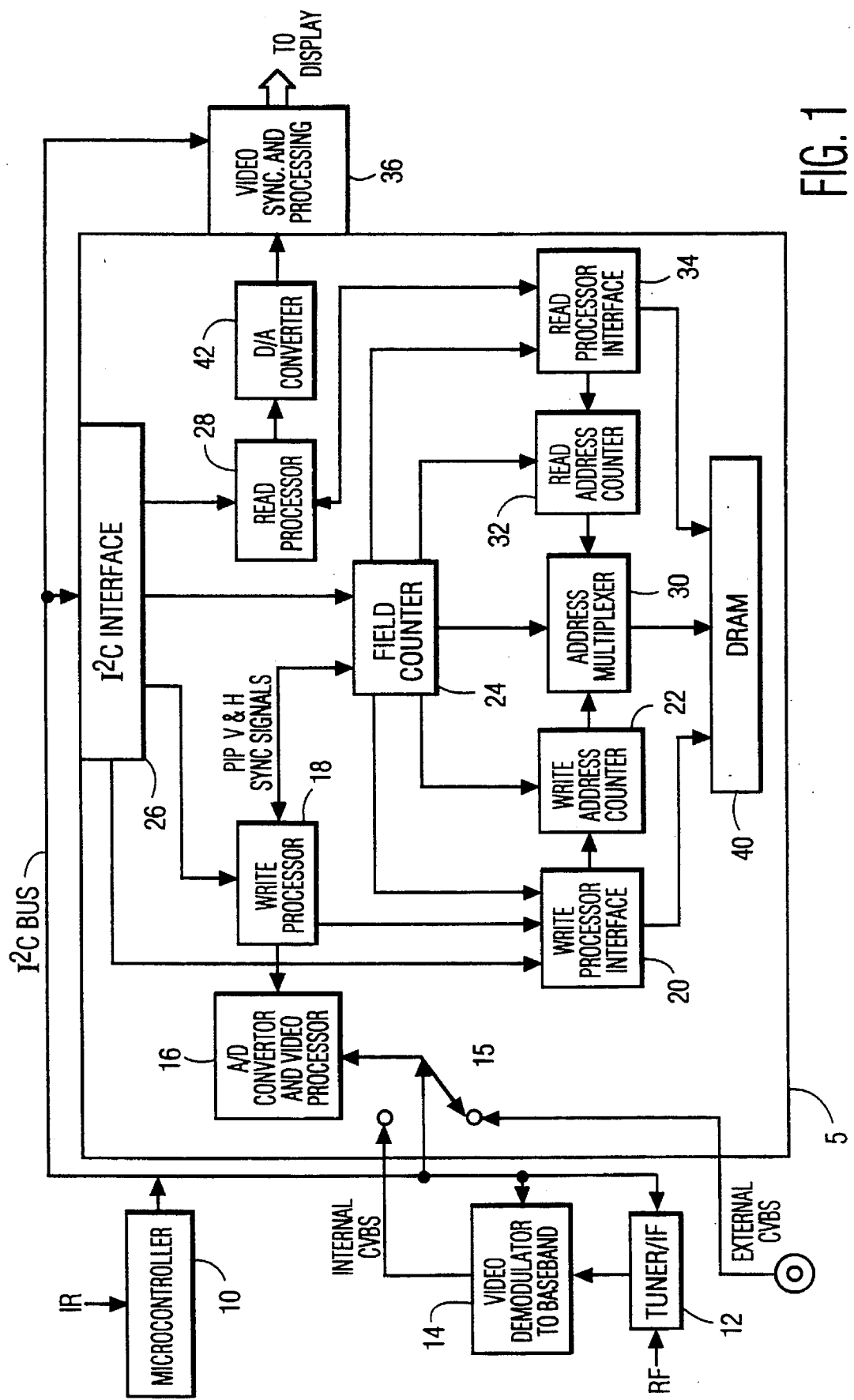
FIG. 1 shows a television receiver including the PIP instant replay circuit of a preferred embodiment of the invention.

Before describing FIG. 1 in detail, a brief description of a PIP system will be provided.

Each picture of a video signal is a frame which includes two fields. A typical video field displayed on the main television display includes approximately 216 horizontal field lines. For PIP there is typically a total of 72 PIP field lines displayed and the PIP is typically 1/9 the size of the main television display (although the PIP size is usually variable). In order to reduce the 216 lines of each field so that the video can be viewed in a PIP, the PIP circuitry must decimate in time the received video. Decimation in time is a type of sub-sampling, an example of which is described in U.S. Pat. No. 4,918,518, hereby incorporated by reference, and which is explained as follows.

The picture is vertically sub-sampled by discarding 2 out of every 3 field lines i.e. maintaining every 3rd field line. Similarly, the picture is horizontally sub-sampled to decrease its width by throwing away various pixels of each maintained field line. Each frame (both fields) is stored in DRAM for interlace correction of the fields and then immediately displayed. Interlace correction requires the top and bottom fields of each frame to be stored so that the field which corresponds to the field being viewed in the main display is displayed in the PIP display, i.e. if a top field is being displayed in the main display, then a top field must be displayed in the PIP display for proper synchronization. The PIP receives its video information (composite video baseband signal (CVBS)) from one of two sources: 1) an internal tuner such as the television tuner or a second television tuner provided specifically for the PIP or 2) an external tuner such as a tuner from a VCR or a cable box.

Reference is now made to FIG. 1 which shows a preferred embodiment of a television receiver having a PIP instant replay circuit.

First, a general analysis of the components of a PIP circuit will be provided disregarding the instant replay portion. Reference is made to FIG. 1 for various components. An RF signal is received and demodulated to IF in the tuner/IF block 12. The IF signal is then demodulated to baseband (composite video baseband signal CVBS) in block 14 and provided to the PIP circuit 5. The operation of the PIP circuit 5, tuner/IF block 12 and the video demodulation to baseband unit 14 is controlled via an I²C bus. The viewer selects the input to the PIP circuit 5 as being from either an internal or external tuner via switch 15 in the television receiver. (This tuner selection can be controlled manually or via the I²C bus). A microcontroller 10 either directly receives a viewer's input for controlling television functions or receives the viewer's input via an infrared transmitter. The CVBS signal for the PIP circuit, which is received from the selected tuner, is A/D converted and video processed into its luminance and chrominance components by A/D converter and video processor 16. The write processor 18 performs decimation in time on each field by selecting the various lines of each field and the various pixels to be displayed in the PIP as described, for example, in U.S. Pat. No. 4,918,518. Two counters, a pixel counter and a line counter, are resident in the write processor 18 and, in addition, the write processor 18 receives the PIP vertical and horizontal sync signals for performing the decimation. The write processor 18 then packages the luminance and chrominance components of the received CVBS into 8 bits. The write processor interface 20 converts the 8 bits into two 4 bit nibbles for storage in the DRAM 40. The field counter 24 keeps track of the top and bottom fields for interlace correction via an internal counter. Every decimated field is written to DRAM 40 via the write processor interface 20. The fields are stored two at a time for interlace correction and then immediately displayed. The address multiplexer 30 provides the appropriate address to DRAM 40 and the write processor interface 20 writes each of the 4 bits of data into the selected address of DRAM 40.

The read processor interface 34 initializes the read address counter 32 upon a request from the read processor 28. The read address counter 32 requests the address location of the appropriate (i.e. top or bottom) field which is stored in the DRAM 40. The multiplexer 30 addresses this location and the field information is provided immediately to the read processor interface 34. Read processor interface 34 converts these two 4 bit nibbles of field information into an 8 bit package which is then received by the read processor 28. Each eight bit package represents a single pixel. The read processor 28 converts the eight bit package back into its luminance and chrominance components. The D/A converter 42 then converts these components into analog form for processing by the video sync and processing circuit 36. In typical PIP operation once a field is displayed, it cannot be displayed again.

A detailed analysis of the PIP instant replay circuit in accordance with the invention is as follows: In the present invention, interlace correction is not performed during instant replay because every field is not being displayed. However, during the process of storing the fields, the PIP may provide interlace correction for normal PIP operation by allocating a portion of the DRAM for interlace correction functions and a portion for instant replay field storage. In this way, a user may be watching a baseball game in the PIP and see a specific play the user wishes to see again. The user will request instant replay and replay that play. While watching the baseball game in real time, the fields will be stored in a first portion of DRAM for interlace correction and a second portion of DRAM for the instant replay feature. Once instant replay is selected, the DRAM is no longer used for interlace correction but rather it provides the stored fields to the display for instant replay.

A user can select the rate at which the PIP fields are acquired (i.e. every other field or every third field, etc.) and the rate at which each field is displayed (i.e. display each field twice). These rates are transmitted to the PIP instant replay circuit via the I²C bus wherein various bits transmitted on the I²C bus determine the acquiring rate and the display rate. Assume that a user selects to acquire one out of every four fields and to display these acquired fields at a display rate of an eighth the normal display speed (very slow motion). This choice enables the user to acquire a greater portion of the video than if every other field is acquired but the smoothness of the video will be partially sacrificed.

The I²C bus receives the acquiring rate (1 out of 4 fields) and the display rate (display each field 8 times). The I²C interface 26 provides these rates to the write processor 18 and the read processor 28 respectively, and both rates are supplied to the field counter 24. The field counter 24 for the present invention includes a counter which has a count of two for interlace correction during normal PIP operation and a counter for counting both the acquired fields during acquisition and the display rate during display. (Note: The same counter can be used for typical PIP operation and instant replay operation by using the last bit of the field counter 24 for keeping track of the top and bottom fields for interlace correction). The field counter 24 is then set for a count of 4 (the acquiring rate). The write processor 18 receives every field and decimates it in time. In a preferred embodiment, the maximum rate of acquiring fields is 1 out of 2 for instant replay, thus there is no need for interlace correction during instant replay.

Depending on engineering choice any one of the four fields can be selected to be written to the DRAM 40. For example, only the third field of every four fields received or only the first field of every four fields received will be written to DRAM 40 etc. In the alternative, all four fields can be stored in the same memory location which results in only the fourth field actually being saved. We will assume that the first Of every four fields is stored. The field counter's count indicates to the write processor interface 20 that the first field received should be written to DRAM 40. The write processor interface 20 causes the write address counter 22 to increment its count and the write address counter 22 requests the address multiplexer 30 to address a first location of DRAM 40. The address multiplexer 30 selects an address from DRAM 40 and the write processor interface 20 writes to the selected address location. The field counter 24 then increments its count for the next received field in response to the PIP vertical sync signals. This count indicates to the write processor interface 20 that the next acquired field is not saved. Upon receipt of the next field the write processor interface 20 does not increment the write address counter 22 and no other writing to DRAM 40 occurs. The next field is then acquired and the field counter 24 is incremented in response to the PIP vertical sync signals and again this next field is not written to DRAM 40. This continues until the fifth field is acquired. Upon acquiring the fifth field, the field counter 24 begins a new count which indicates to the write processor interface 20 that the write address counter 22 should be incremented. The write address counter 22 then requests the address multiplexer 30 to select the next address location in DRAM 40. The write processor interface 20 then writes the fifth field to DRAM 40. The next three fields are acquired and decimated but not written to DRAM 40. This process continues until a stop acquiring signal is received by the field counter via the I$^2$C interface 26. If the end of the DRAM is reached before a stop acquiring signal is received the write processor 20 begins to rewrite over the stored fields. The read address counter 32 keeps track of the first memory location to be displayed.

Two nibbles represent one pixel. Accordingly, a one meg by 4 bit DRAM can store approximately 58 fields of ⅑th size PIP video. Assuming such a DRAM is being used, once 58 fields are stored, the multiplexer 30 reinitializes and addresses the first memory location again. This causes the write processor interface 20 to rewrite over the fields already stored until a user initiated stop acquiring signal is received by the write processor interface 20. Once the stop acquiring signal is received by the field counter 24 and a display command is received by the read processor 28, the field counter 24 initializes to the count required for the requested display rate, i.e., an eight count in this example.

Once the stop acquiring signal is received by the address multiplexer 30, it then switches over to receive address information from the read address counter 32. The read processor 28 requests a first field from the read processor interface 34. The read processor interface 34 causes the read address counter 32 to initialize its count. The read address counter 32 causes the address multiplexer 30 to select the address in which the first field to be displayed is located in the DRAM 40. The first field of information is provided by the selected address location in the DRAM 40 to the read processor interface 34. The read processor interface 34 converts the two 4 bit nibbles of information to an 8 bit packet which is then received by the read processor 28, D/A converted by D/A converter 42 and video sync and processed in block 46. The field counter 24 is incremented but because the display rate corresponds to displaying each field eight times the read processor interface 34 is signalled by the field counter count not to increment the address counter 32. Accordingly, the address multiplexer 30 chooses the same address from the DRAM 40 and the same field of information is subsequently displayed. This is repeated for a field counter count of eight which means the same field is displayed eight times, resulting in slow motion instant replay.

The field counter 24 then reinitializes and the ninth field of information is selected which is really the second field stored in the DRAM 40. The second field is also displayed for eight counts of the field counter 24. This continues until the last address of the DRAM 40 in which field information is stored is addressed or a user initiated command to end instant replay is received. Once the last field is displayed eight times the address multiplexer 30 rolls back to the address of the first field of information in DRAM 40 and the same fields are displayed over and over again at the requested display rate until a command to end instant replay is received by the read processor 28.

A user can also select a single step mode whereby each stored field can be viewed at the user's leisure. The read processor 28 will request a first field and this field is repeatedly displayed until the user selects to display the next field. In this way a viewer can study every stored field in detail at his/her own pace.

As explained above, the user can select both the acquiring rate and the display rate of the received fields. The minimum length of video which can be stored is just under 2 seconds in a 1 meg by 4 bit DRAM. This would be storing every other field. If every fourth field is acquired then just under 4 seconds of video can be stored. It should also be noted that the circuit can be constructed to enable replay of the stored fields in reverse. For example, the read address counter could also keep track of the last field stored.

It will thus be seen that the objects set forth above, among those made apparent from the preceding description, are efficiently attained and since certain changes may be made in the above constructions without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific feature of the invention herein described, and all statements of the scope of the invention which, as a matter of language, might be said to fall there between

What is claimed is:

1. A method of providing video instant replay of a sequence of fields in a picture-in-picture (PIP) display of a television receiver, comprising the steps of:

acquiring each field of a string of consecutive video fields;

displaying each field of the string of consecutive video fields on the television receiver;

decimating in time said each field of said string of consecutive video fields;

selecting a plurality of non-consecutive fields of said string of consecutive video fields to be stored in a memory for future re-display;

storing the plurality of non-consecutive decimated fields in said memory;

retrieving the stored fields from the memory in sequence; and re-displaying in the PIP the sequence of fields previously displayed on the television and retrieved from the memory.

2. The method as claimed in claim 1, wherein the step of re-displaying displays the fields that have been decimated at a user selected re-display rate.

3. The method as claimed in claim 2, wherein the step of re-displaying repeatedly re-displaying a decimated field to achieve the user selected re-display rate.

4. The method in accordance with claim 1, wherein the step of decimating is performed on only the selected plurality of non-consecutive fields.

5. The method as claimed in claim 2, further including the step of:

selecting a single step mode wherein the re-display rate is variable for each field being re-display and the user controls the re-display rate for each field.

6. The method as claimed in claim 1, wherein the step of re-displaying repeatedly re-displays the sequence of stored fields until a user selects to stop the step of re-displaying.

7. The method as claimed in claim 1, wherein the step of re-displaying re-displays the sequence of fields in an order which is reverse to the order the fields were acquired.

8. A method of providing video instant replay of a sequence of fields in a picture-in-picture (PIP) display of a television receiver, comprising the steps of:

receiving video baseband information as a string of consecutive video fields;

displaying the string of consecutive video fields on the television receiver;

A/D converting and processing the string of consecutive video fields into luminance and chrominance components;

decimating the A/D converted string for re-display in the picture-in-picture display;

selecting for re-display in the PIP a plurality of non-consecutive fields form the string of decimated fields;

storing the selected decimated fields in contiguous memory locations;

selecting a re-display rate of the selected decimated fields;

retrieving the decimated fields in the sequence in which they were stored; and re-displaying the sequence of fields, previously displayed on the television receiver, at the selected re-display rate.

9. A device for providing instant replay of a sequence of fields in a picture-in-picture (PIP) display of a television receiver, comprising means for receiving each field of a string of consecutive video fields;

means for displaying the string of consecutive video fields on the television receiver;

an A/D converter for converting the fields into digital form;

a video processor for processing the fields into luminance and chrominance components;

a write processor for decimating the luminance and chrominance components of each field;

a selector for selecting a plurality of non-consecutive fields of said string of consecutive video fields for re-display in the PIP;

a field counter for counting the received fields and for providing a count which indicates which of the received fields are the selected fields which are to be re-displayed;

a memory for storing the selected fields;

a read processor for requesting re-display of the selected fields in the stored memory;

an input for receiving re-display rate information which indicates the length of time each field is re-displayed in the picture-in-picture display and wherein the field counter includes a counter for keeping track of the fields being re-displayed such that each field is repeatedly re-displayed in accordance with the re-display rate.

10. A television receiver including a device for providing picture-in-picture (PIP) instant replay comprising:

means for receiving video field information in the form of a string of consecutive fields;

an A/D converter coupled to the means for receiving, for converting the video field information into digital form;

a write processor coupled to the A/D converter for decimating in time the field information;

a selector for selecting a plurality of non-consecutive fields form the string of consecutive fields for display in the PIP;

a field counter for receiving information regarding the fields selected to be displayed and a specified length of time each of the fields selected is to be displayed;

a memory;

a write processor interface for storing to the memory; under control of the field counter, the fields selected;

a multiplexer for addressing the locations in the memory to receive the fields selected;

a write address counter coupled to the multiplexer and the write processor interface for maintaining a count of the fields selected stored in the memory and for providing this count to the multiplexer;

an input coupled to the field counter for receiving a display command, which display command indicates the length of time each field selected is to be displayed;

a read processor, coupled to the input, for requesting display of the fields selected and stored;

a read processor interface coupled to the memory and the read processor for reading the stored fields from the memory; and a read address counter for requesting from the multiplexer the address location for the next stored field to be displayed, and wherein the field counter controls the read address counter such that each field is displayed for the specified length of time.

11. A device for providing video instant replay of a sequence of fields in a picture-in-picture (PIP) display of a television receiver, comprising:

a memory;

an acquiring device for acquiring each field of a string of consecutive video fields;

a means for displaying the string of consecutive video fields on the television receiver;

a decimator for decimating in time said each field;

a selector for selecting a plurality of non-consecutive fields of said string of consecutive fields to be stored in the memory and re-displayed in the PIP;

a write processor for writing the selected plurality of non-consecutive decimated fields in the memory; and a read processor for reading the stored fields from the memory in sequence and for providing the sequence to the PIP display for re-display in the PIP.

12. A device as claimed in claim 11, further including a field counter for counting the fields of the string of consecutive fields and for providing a count to the write processor which indicates which fields are the selected fields.

13. A device as claimed in claim 11, further including an input for receiving re-display rate information which indicates the length of time each stored field is re-display and wherein the read processor does not read a next field from the memory until expiration of the length of time and the PIP display displays each field for the length of time.

14. A device as claimed in claim 11, wherein the memory is a DRAM.

15. A device as claimed in claim 12, wherein the field counter is a five bit field counter wherein a least significant bit is used during non-instant replay picture-in-picture interlace correction.

16. A device as claimed in claim 11, wherein the read processor reads each stored frame repeatedly until a user selects to view a next stored frame.

17. A device as claimed in claim 13, wherein the read processor reads each stored field repeatedly for the length of time determined by the re-display rate information and the PIP display re-displays each stored field repeatedly for the length of time determined by the re-displays rate information.

18. A device as claimed in claim 11, wherein the read processor reads the sequence of stored fields in an order which is reverse to the order in which the fields were acquired and wherein the PIP display re-displays the stored fields in the reverse order.

19. A device as claimed in claim 13, wherein the field counter keeps count for determining the expiration of the length of time.

20. A device as claimed in claim 17, wherein the field counter counts vertical sync signals of the fields read by the read processor to determine the expiration of the length of time.

21. A television receiver including a device for providing video instant replay of a sequence of fields, previously displayed on the television receiver, in a picture-in-picture (PIP) display of the television receiver, comprising:

a memory;

an acquiring device for acquiring each field of a string of consecutive video fields and for displaying on the television receiver the string of consecutive video fields;

a decimator for decimating in time each said field of said string of consecutive video fields;

a selector for selecting a plurality of non-consecutive fields of said string of consecutive fields to be stored in the memory for re-display in the PIP;

a write processor for writing the selected plurality of non-consecutive decimated fields in the memory; and a read processor for reading the stored fields from the memory in sequence and for providing the sequence to the PIP display for re-display.

* * * * *